(12) United States Patent
Deilmann et al.

(10) Patent No.: US 10,514,280 B2
(45) Date of Patent: Dec. 24, 2019

(54) TRIGGERING A PROCESS IN A MEASURING UNIT USING A MOVEMENT PATTERN

(71) Applicant: KROHNE Messtechnik GmbH, Duisburg (DE)

(72) Inventors: Michael Deilmann, Essen (DE); Thilo Trapp, Dorsten (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 134 days.

(21) Appl. No.: 15/797,259

(22) Filed: Oct. 30, 2017

(65) Prior Publication Data
US 2018/0120134 A1 May 3, 2018

(30) Foreign Application Priority Data

Oct. 31, 2016 (DE) .................. 10 2016 120 740

(51) Int. Cl.
*G01D 21/00* (2006.01)
*G06F 3/01* (2006.01)
*G01D 18/00* (2006.01)

(52) U.S. Cl.
CPC ............ *G01D 21/00* (2013.01); *G06F 3/017* (2013.01); *G01D 18/00* (2013.01)

(58) Field of Classification Search
CPC ......... G01D 18/00; G01D 21/00; G06F 3/017
See application file for complete search history.

(56) References Cited

U.S. PATENT DOCUMENTS

| 4,718,775 A | 1/1988 | Keznickl |
| 9,261,969 B2 | 2/2016 | Dangi et al. |
| 9,715,283 B2 | 7/2017 | Elkins et al. |
| 2008/0252737 A1* | 10/2008 | Morehouse ........... G06F 3/0304 348/222.1 |

(Continued)

FOREIGN PATENT DOCUMENTS

| DE | 10 2014 015 910 A1 | 5/2016 |
| WO | 92/16821 A1 | 10/1992 |
| WO | 2016/137294 A1 | 9/2016 |

OTHER PUBLICATIONS

Halo pH Electrodes With Bluetooth® Smart Technology, Hanna Instruments. pp. 1-12.

*Primary Examiner* — Nathaniel J Kolb
(74) *Attorney, Agent, or Firm* — David S. Safran; Roberts Mlotkowski Safran Cole & Calderon, P.C.

(57) ABSTRACT

A method for operating a measuring unit having at least one parameter sensor, at least a position sensor and/or an acceleration sensor, and at least a control and evaluation unit, the position sensor and/or the acceleration sensor being connected to the control and evaluation unit, the position sensor emitting a position signal and/or the acceleration sensor emitting an acceleration signal to the control and evaluation unit. At least one process relevant to the operation of the measuring unit is triggered when at least one part of the measuring unit is moved in a first movement pattern, wherein the first movement pattern comprises a sequence of at least two movements and/or at least a partial process of the process or a process is triggered when at least one part of the measuring unit is moved according to a second movement pattern, wherein the second movement pattern comprises at least one movement.

20 Claims, 5 Drawing Sheets

(56) References Cited

U.S. PATENT DOCUMENTS

| | | | |
|---|---|---|---|
| 2013/0147850 A1 | 6/2013 | Li et al. | |
| 2013/0344609 A1* | 12/2013 | Mayer | G01N 33/497 436/133 |
| 2015/0277572 A1 | 10/2015 | Verplaetse et al. | |
| 2016/0059120 A1* | 3/2016 | Komorous-King | A63F 13/211 463/36 |
| 2016/0252969 A1* | 9/2016 | Lee | G06F 3/0488 345/156 |

* cited by examiner

TRIGGERING A PROCESS IN A MEASURING UNIT USING A MOVEMENT PATTERN

BACKGROUND OF THE INVENTION

Field of the Invention

The invention relates to a method for operating a measuring unit, wherein the measuring unit has at least one sensor unit for measuring at least one parameter, at least a position sensor and/or an acceleration sensor, and at least a control and evaluation unit, wherein the position sensor and/or the acceleration sensor is/are connected to the control and evaluation unit, and wherein the position sensor emits a position signal and/or the acceleration sensor emits an acceleration signal to the control and evaluation unit.

Description of Related Art

The invention further relates to a measuring unit, comprising at least a sensor unit for measuring a preferably physical parameter, at least a position sensor and/or an acceleration sensor and at least a control and evaluation unit, wherein the position sensor and/or the acceleration sensor is/are connected to the control and evaluation unit.

Simple analytical measuring units, which comprise at least one sensor for measuring a physical parameter, typically have neither status displays in the form of LEDs or displays, nor parameterization possibilities, via e.g., push-buttons. Therefore, a control unit, such as a transmitter or a handheld, is required in order to control the sensors.

Recently, these simple measuring units have also been equipped with electronics which implement the complete sensor control and data evaluation. In particular, the question arises as to how processes relevant to the operation of the measuring unit, such as, for example, calibration of the sensor, can be triggered and controlled in the field or in the laboratory without the need for a complex infrastructure.

The use of position sensors and/or acceleration sensors, which convert a change in the position and/or the acceleration of the measuring unit into a measurable position signal and/or acceleration signal, is known from the prior art. Such a position signal and/or acceleration signal can be characterized, in particular, by the temporal course of the amplitude. It is known, for example, to put the measuring unit into a certain state, for example, into the measuring mode, using a movement.

The document German Patent Application DE 41 07 853 A1 and corresponding International Patent Application Publication WO 92/16821 disclose an electronic fever thermometer comprising an acceleration sensor, wherein a temperature measurement is started with a shaking movement of the fever thermometer.

In addition, it is known from the prior art, for example, from German Patent Application DE 10 2014 015 910 A1 to equip mobile gas measuring devices with a sensor system, which is sensitive to movement, vibration, shock, pivoting or rotation and which detects a change in the position of the gas measuring device and assigns an event that is the cause of the change in the position of the gas measuring device, such as a fall, to the change of position. Thus, after a fall, the gas measuring device can impart that the sensor system is possibly damaged and no longer operates reliably. As a result, the functional safety of the mobile gas measuring device can thereby be increased.

SUMMARY OF THE INVENTION

Based on the prior art as explained above, the object of the present invention is to provide a method for operating a measuring unit which allows for a particularly simple triggering and control of processes concerning the operation of the measuring unit and, furthermore, prevents the unintentional evaluation of position and/or acceleration signals. In addition, the object of the invention is to provide a corresponding measuring unit.

The above object is achieved according to a first teaching of the invention by a method mentioned at the outset in that at least one process relevant to the operation of the measuring unit is triggered when at least one part of the measuring unit is moved according to a first movement pattern, wherein the first movement pattern comprises a sequence of at least two movements and/or at least a partial process of the process or a process is triggered when at least one part of the measuring unit is moved according to a second movement pattern, wherein the second movement pattern comprises at least one movement. The process triggered by the first movement pattern can have at least one partial process, i.e. several process steps, or alternatively only one process step. If a partial process of a process is triggered by at least one part of the measuring unit being moved according to a second movement pattern, the superordinate process may have been triggered either by at least one part of the measuring unit being moved according to a first movement pattern; or alternatively may have been triggered elsewhere. An alternative type of triggering is described below.

According to the invention, it has been recognized that, with the help of movements and/or position changes and/or changes in the orientation in space of at least one part of the measuring unit, a process relevant to the operation of the measuring unit can be triggered and a process comprising a plurality of process steps can be controlled such that at least one partial process is triggered by at least one movement of the measuring unit. According to the invention, the first movement pattern for triggering a process has a sequence of at least two movements. This ensures that a process is not inadvertently triggered by a movement of the measuring unit, for example by accidental shaking. If, however, a process which comprises several process steps, that is, a plurality of partial processes, is triggered, at least one partial process can be triggered according to the invention by a second movement pattern. This second movement pattern comprises at least one movement of the measuring unit.

According to one design, a process or a partial process can be triggered if only a part of the measuring unit is moved, wherein this part comprises the at least one position sensor and/or the at least one acceleration sensor. According to this design, the method can also be used with measuring units that cannot be moved in the measuring configuration because of their weight or their dimensions or their arrangement.

A process which, as described above, is triggered by a first movement pattern relates to the operation of the measuring unit. For example, the measuring unit can be placed in a different operating mode, for example in a standby mode, when at least a part of the measuring unit is moved according to a first movement pattern. Alternatively, or additionally, the measuring operation can be triggered or a measurement can be started when at least a part of the measuring unit is moved according to a first movement pattern. If a measurement is triggered, this can preferably be terminated by at least one part of the measuring unit being moved according to a second movement pattern. In addition, a calibration process can also be triggered when at least a part of the measuring unit is moved according to a first movement pattern. It is particularly preferred that, during calibration, individual partial processes are triggered by at least one part of the measuring unit being moved according to a second movement pattern. It is preferred when different processes in the measuring unit are triggered by different movement patterns. In this case, it is particularly preferred when exactly one process is assigned to each first movement pattern.

According to a further embodiment, the measuring unit is put into a state, by at least one movement of the first movement pattern and/or by at least one movement of the second movement pattern, in which the control and evaluation unit looks for further position signals and/or acceleration signals. This design has the advantage that not every unintended movement of the measuring device is registered and evaluated by the control and evaluation unit.

According to a further advantageous design of the method according to the invention, movement of the measuring unit is carried out by shaking, vibration, rotation, preferably by an angle of 90° and/or by 180° and/or by 270°, or pivoting of the sensor. In addition, all other conceivable movements of the measuring unit are also suitable for triggering a process or a partial process.

A first movement pattern corresponds, for example, to one of the following movement sequences:

"Shake-Pause-Shake" or "Shake-Rotate by 180°-Shake" or "Rotate by 90°-Shake-Rotate by 90°". Each sequence of movements, which is different from a random movement of the measuring unit, is also suitable in the present context for triggering a process.

According to a further design, the first movement pattern and/or the second movement pattern comprises at least two identical movements and/or at least two different movements.

Particularly preferably, the process triggered by the first movement pattern is a routine for calibrating the sensor unit. If the sensor unit is, for example, a pH sensor, the routine for calibrating the pH sensor preferably comprises the method steps: calibration with a first buffer solution, signaling, calibration with a second buffer solution, signaling, optional calibration with a third buffer solution, termination of calibration and return to measuring operation. The individual buffer solutions each have different known pH values. The calibration with the first buffer solution determines the zero point of the measuring unit, wherein the buffer solution preferably has a pH of 7. The calibration with a second buffer solution determines the slope, wherein the second buffer solution has, for example, a pH of 2 or a pH of 4.

According to a further embodiment of the method according to the invention, the measuring unit has at least one interface for receiving a plug-in module and a plug-in module, wherein the position sensor and/or the acceleration sensor is/are preferably arranged in the plug-in module.

According to a further embodiment, the measuring unit has an interface for receiving a plug-in module and a plug-in module, wherein the plug-in module has a recognition element for marking the plug-in state, in particular an electrical resistance, a data storage or an RFID chip, and wherein the control and evaluation unit is sensitive to position signals and/or acceleration signals only when the plug-in state is detected.

Particularly preferably, at least one process comprising at least one partial process is triggered by inserting the plug-in module into the interface, and at least a partial process is triggered by at least one part of the measuring unit being moved according to a second movement pattern. The plug-in module is connected to the control and evaluation unit by plugging it into the interface. This design improves the method in that an unintended triggering of a process is virtually eliminated.

It is advantageous when the plug-in module has a display for outputting information concerning the process and/or the partial process and/or the status of the sensor unit, wherein, in particular, the result of a process and the status of the sensor unit are output, and wherein, after the process, but before changing the operating mode, the result and the status display are displayed alternately until the operating mode is changed.

According to a further preferred design, the measuring unit, in particular the sensor unit, outputs a feedback signal, in particular an optical signal and/or acoustic signal and/or a vibration signal, when a process and/or a partial process is triggered and/or terminated. According to this design, the user is additionally informed that a process or a partial process is triggered and/or terminated, whereby the reliability of the measuring unit can be further increased.

Particularly preferably, the measuring unit outputs a feedback signal only when a process and/or a partial process is terminated successfully. Alternatively, the measuring unit, in particular the sensor unit, can emit a feedback signal when a process and/or a partial process is triggered and/or terminated, and an additional feedback signal when a process and/or a partial process is terminated successfully, wherein the additional feedback signal differs from the feedback signal for triggering and/or terminating a process and/or partial process.

According to a further advantageous design, a plurality of position signals and/or acceleration signals are stored in the control and evaluation unit, wherein a first number of position signals and/or acceleration signals are comparison signals for movement sequences according to the first movement pattern, and wherein a second number of position and/or acceleration signals are comparison signals for movements according to the second movement pattern, wherein a process or partial process is assigned to each comparison signal, wherein the position signal emitted by the position sensor and/or the acceleration signal emitted by the acceleration sensor is/are compared with the comparison signals stored in the control and evaluation unit, and wherein a process or partial process is triggered as a result of this comparison.

In this case, a comparison signal can have either a single position signal and/or acceleration signal or a sequence of position signals and/or acceleration signals. The individual comparison signals thus also form comparison patterns which are assigned to a process and/or partial process. According to this design, a plurality of processes and partial processes of the measuring unit can be controlled via movements or movement sequences of the measuring unit.

According to a second teaching of the present invention, the above object is achieved by a measuring unit mentioned at the outset in that the control and evaluation unit is designed in such a manner that that, provided that at least a part of the measuring unit is moved according to a first movement pattern, the control and evaluation unit triggers a process, and/or that, provided that at least one part of the measuring unit is moved according to a second movement pattern, the control and evaluation unit triggers a partial process. The first movement pattern comprises a sequence of at least two movements and the second movement pattern comprises at least one movement.

According to a preferred design, the measuring unit has an interface for receiving a plug-in module and a plug-in module.

According to a further preferred design, the position sensor and/or the acceleration sensor is/are arranged in the plug-in module.

It is also advantageous when the control and evaluation unit evaluates whether the plug-in module is inserted into the interface and, when the plug-in state is detected, evaluates the position signal and/or the acceleration signal.

For this, the plug-in module has, for example, a recognition element for marking the plug-in state, in particular an electrical resistance, a data storage or an RFID chip.

According to a further design, the control and evaluation unit is designed in such a manner that it automatically triggers a process relevant to the operation of the measuring unit when the plug-in module is connected to the control and evaluation unit via the interface, and that, provided that at least a part of the measuring unit is moved according to a second movement pattern, the control and evaluation unit triggers a partial process of the process.

According to a further design of the measuring unit according to the invention, the measuring unit carries out one of the above-described methods during operation.

According to a further design, the sensor unit is designed as a pH sensor or as a temperature sensor or as a conductivity sensor or as a thermal conductivity sensor or as a gas sensor, in particular as a chemical sensor or as a moisture measurement sensor or as a combination of two or more of the aforementioned sensors.

According to a further design, the sensor unit has a status. Particularly preferably, the plug-in module has a display for outputting information concerning the process and/or the partial process and/or the status of the sensor unit. If the sensor unit is designed as a pH sensor and if a calibration process is triggered by connecting the plug-in module to the control and evaluation unit, the following individual process steps or information relating to the sensor status can be output, for example.

The following information can be output during the calibration process:
Calibration mode
Buffer 1
Change buffer solution
Buffer 2
Calibration OK
Calibration not OK
After the calibration procedure, the following information can be output as calibration result:
Slope
Zero point
Information about sensor status can also be output:
Good
Maintenance Required
Replace sensor In addition, the evaluation output via the display can be used to determine whether the calibration was good or less good or barely useful.

Preferably, the plug-in module has an integrated battery pack, which can be charged using a micro USB connection or inductively in a charging station. It is particularly preferred that a battery display is provided that shows the loading status after plugging the plug-in module into the interface.

In detail, there is a plurality of possibilities for designing and further developing the method according to the invention and the measuring unit according to the invention. For this, reference is made to the following description of preferred embodiments and accompanying drawings.

DETAILED DESCRIPTION OF THE INVENTION

Figure 1:
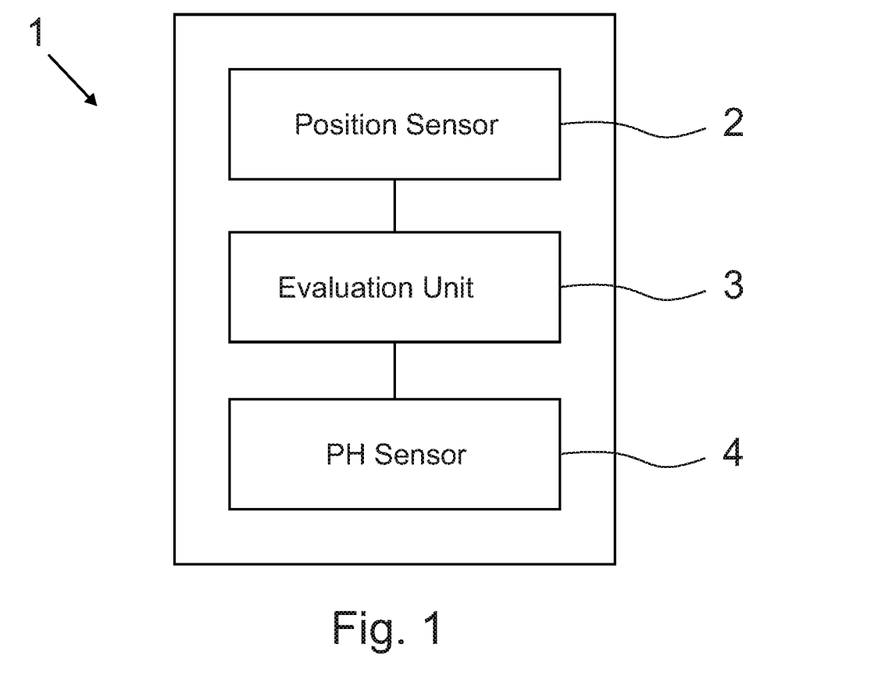
FIG. 1 shows a first embodiment of a measuring unit according to the invention.

FIG. 1 shows a first embodiment of a measuring unit 1 comprising a pH sensor 4, a position sensor 2 and a control and evaluation unit 3, wherein the position sensor 2 is connected to the control and evaluation unit 3. The control and evaluation unit 3 is designed in such a manner that, if at least a part of the measuring unit 1 is moved according to a first movement pattern, the control and evaluation unit 3 triggers a process, and that, if at least a part of the measuring unit 1 is moved according to a second movement pattern, the control and evaluation unit 3 triggers a partial process. For this, the control and evaluation unit 3 is also connected to the pH sensor 4. The illustrated measuring unit 1 has the advantage that processes that relate the operation of the measuring unit 1 can be triggered and controlled particularly simply by a defined movement of the measuring unit 1.

Figure 2:
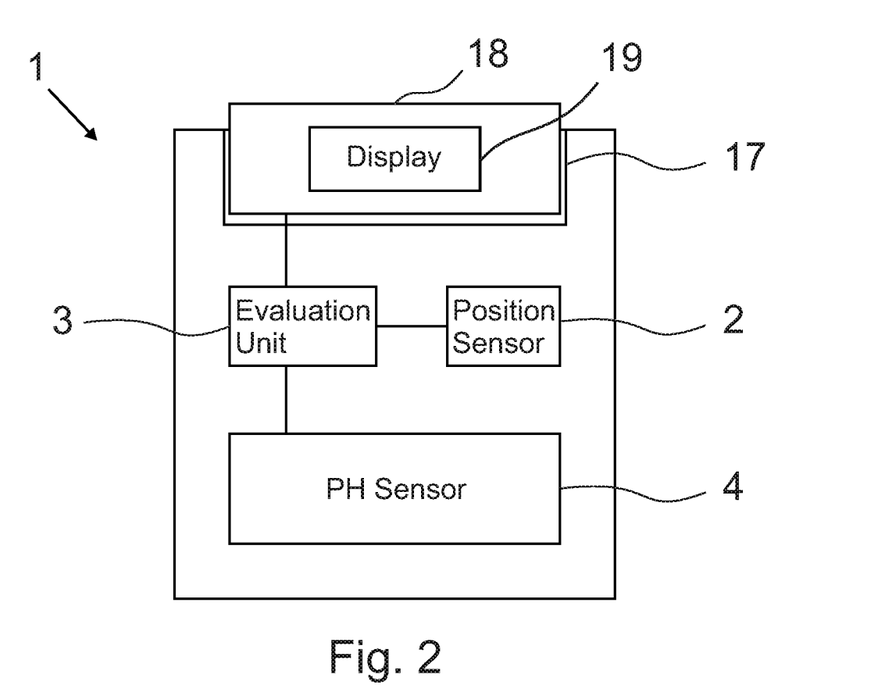
FIG. 2 shows a second embodiment of a measuring unit according to the invention.

FIG. 2 shows a second embodiment of a measuring unit 1 comprising a pH sensor 4, a position sensor 2 and a control and evaluation unit 3, wherein the position sensor 2 is connected to the control and evaluation unit 3. In addition, the illustrated measuring unit has an interface 17 for receiving a plug-in module 18. A plug-in module 18 is connected to the interface 17 in the embodiment shown, wherein the plug-in module 18 has a display 19 for outputting information relating to the process and the status of the pH sensor 4.

The control and evaluation unit 3 is designed in such a manner that, if the control and evaluation unit 3 is connected to the plug-in module 18 via the interface 17, the control and evaluation unit 3 triggers a process, and that, if the measuring unit 1 is moved according to a second movement patter, the control and evaluation unit 3 triggers a partial process. For this, the control and evaluation unit 3 is also connected to the pH sensor 4.

Alternatively, the position sensor 2 can also be arranged in the plug-in module 18.

Figure 3:
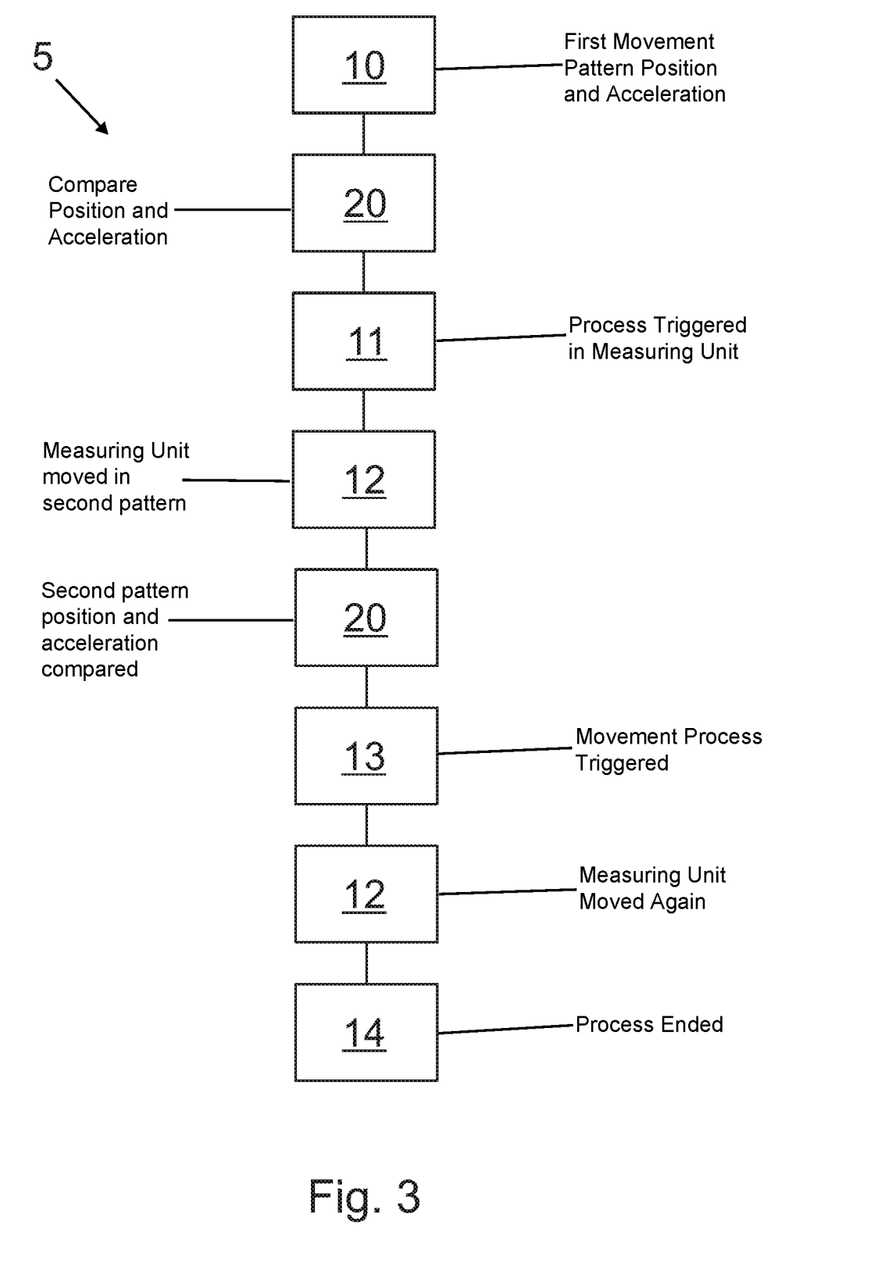
FIG. 3 shows a first embodiment of a method according to the invention.

FIG. 3 shows a first embodiment of a method 5 according to the invention for operating a measuring unit 1, wherein the measuring unit 1 has a sensor unit for measuring a parameter, a position sensor 2 and an acceleration sensor and a control and evaluation unit 3, wherein the position sensor 2 and the acceleration sensor are connected to the control and evaluation unit 3, and wherein the position sensor 2 and the acceleration sensor emit a position signal or an acceleration signal to the control and evaluation unit 3. In addition, comparison signals are stored in the control and evaluation unit 3, wherein a process or a partial process is assigned to each comparison signal.

In a first step 10, the measuring unit 1 is moved according to a first movement pattern. The position sensor 2 and the acceleration sensor then send a position signal and an acceleration signal to the control and evaluation unit 3. In the control and evaluation unit, the position signal and the acceleration signal are compared 20 to the comparison signals. Based on this comparison, a process assigned to the movement pattern is triggered 11 in the measuring unit 1. In the illustrated embodiment, the triggered process has several steps and, in this respect, at least one partial process. If the measuring unit 1 is moved in a next step 12 according to a second movement pattern, a partial process is triggered after a comparison 20 with comparison signals. The measuring unit 1 is moved again according to a second movement pattern 12 to terminate 14 the process.

This method 5 has the advantage that processes related to the operation of the measuring unit 1 can be triggered and controlled particularly simply by moving the measuring unit 1.

Figure 4:
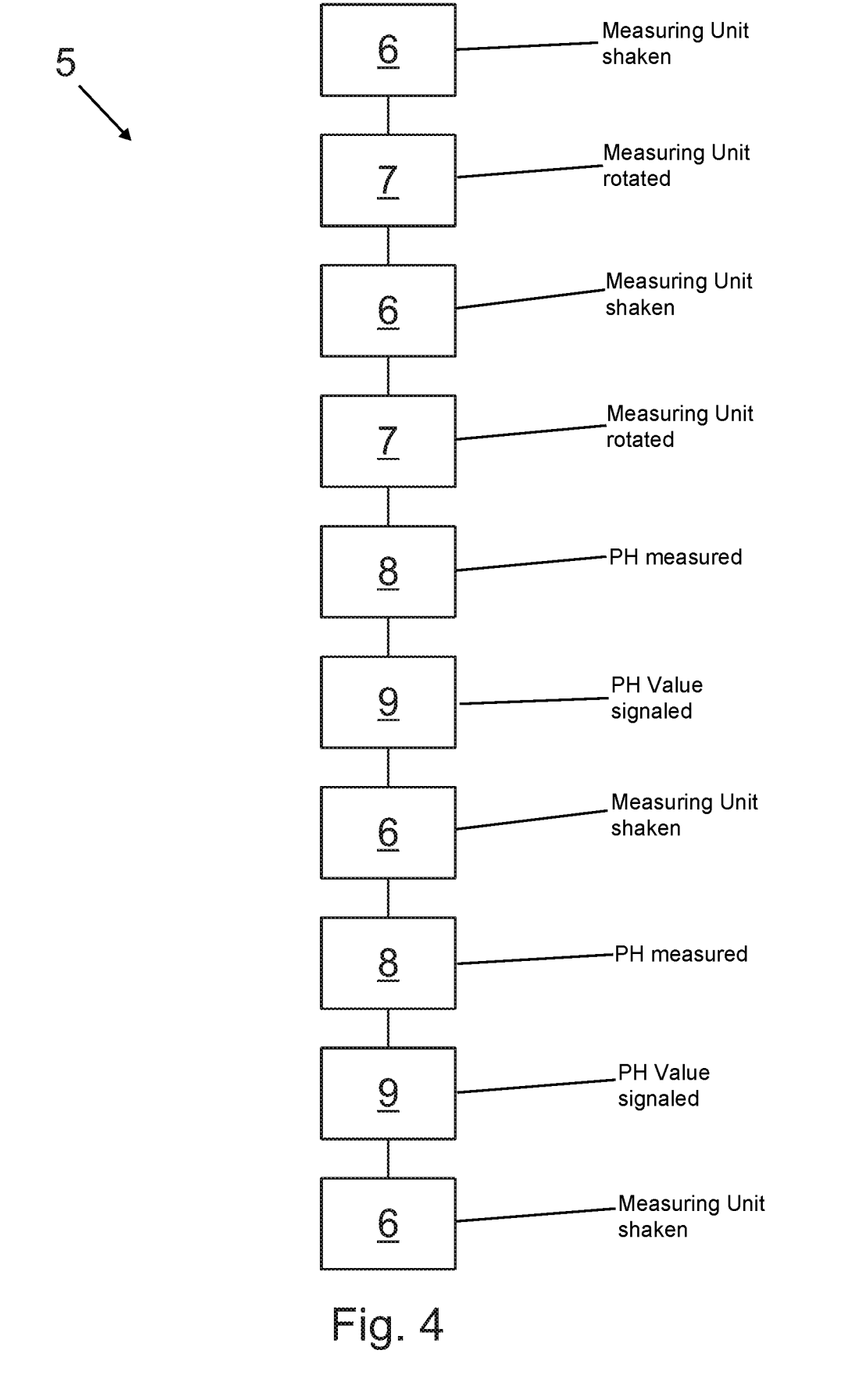
FIG. 4 shows a second embodiment of a method according to the invention and FIG. 5 shows a third embodiment of a method according to the invention.

FIG. 4 shows a second embodiment of a method 5 for operating a measuring unit 1, wherein the measuring unit 1 has at least one pH sensor 4 for measuring the pH value of a liquid, at least one position sensor 2 and at least one control and evaluation unit 3, wherein the location sensor 2 is connected to the control and evaluation unit 3, and wherein the location sensor 2 emits a position signal to the control and evaluation unit 3. In the illustrated embodiment, a calibration process is triggered when the measuring unit 1 is moved according to a defined first movement pattern, and, during calibration, different partial processes are triggered when the measuring unit 1 is moved according to a second defined movement pattern.

For this, the measuring unit 1 is shaken in a first step 6, thereby activating the measuring unit. In a subsequent step 7, the measuring unit 1 is rotated by 180°. The measuring unit 1 is then shaken again 6 in order to start the calibration. In a next step 7, the measuring unit 1 is again rotated by 180°. The pH sensor 4 is now immersed into first buffer solution with a first pH value. For signaling 8, the pH value of the buffer solution is measured and, if the measured value deviates from the known pH value of the first buffer solution, the measured value in the sensor is corrected. The pH sensor provides the user with a feedback signal in the form of an optical or acoustic signal in a next step 9 when the calibration has been successful. After calibration in the first buffer solution, the measuring unit 1 is shaken again 6 and immersed in a second buffer solution, wherein the pH value of the second buffer solution deviates from the pH value of the first buffer solution. For subsequent signaling 8, the pH of the second buffer solution is measured, and if the measured value deviates from the known pH value of the second buffer solution, the measured value is corrected. The transmission 9 of a feedback signal informs the user that the calibration was successful. The pH sensor is then put back into the measuring mode by a subsequent shaking 6.

Figure 5:
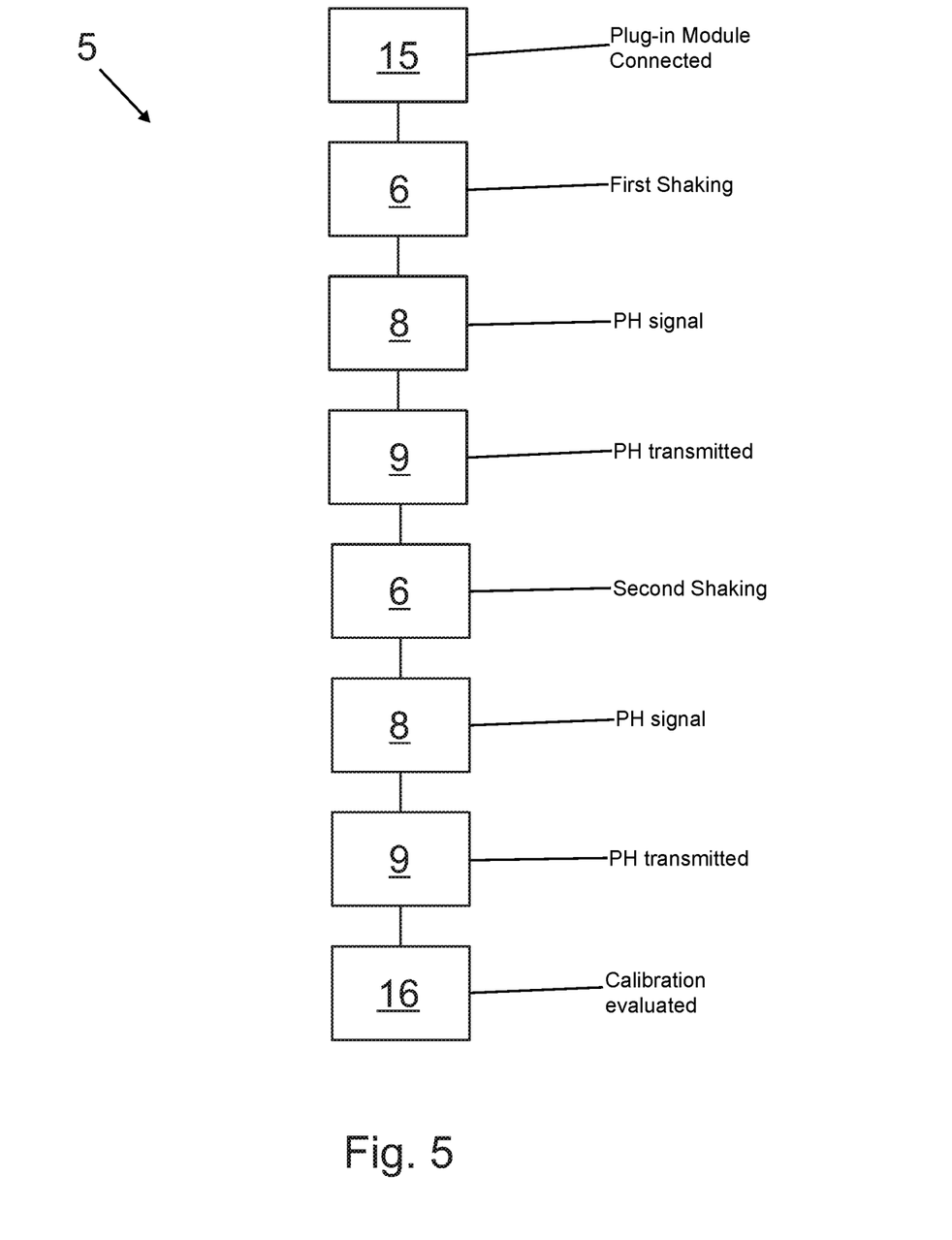
Figure 6:
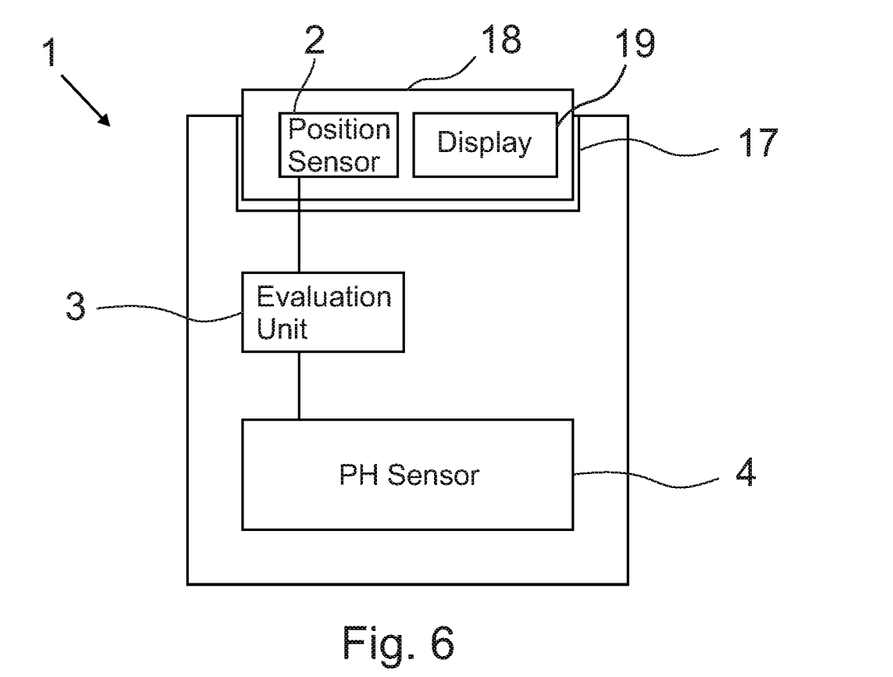

FIG. 5 shows a third embodiment of a method 5 for operating a measuring unit 1, wherein the measuring unit 1 has a pH sensor 4 for measuring the pH value of a liquid, a position sensor 2 and a control and evaluation unit 3, wherein the position sensor 2 is connected to the control and evaluation unit 3, and wherein the position sensor 2 emits a position signal to the control and evaluation unit 3. In addition, the measuring unit 1 has an interface 17 for receiving a plug-in module 18, wherein the plug-in module 18 has a display 19 via which information concerning the process and/or the partial process and the status of the pH sensor are displayed.

In a first step 15 of the method, the plug-in module 18 is connected to the control and evaluation unit 3 via the interface 17, whereby the calibration mode is triggered in the measuring unit 1, more exactly in the pH sensor 4. The calibration in the first buffer solution is triggered by a first shaking 6, wherein the calibration comprises the steps of signaling 8 and transmitting 9 a feedback signal. With a second shaking, the calibration in a second buffer solution is triggered, which also comprises the steps of signaling 8 and transmitting 9 a feedback signal. Finally, the plug-in module provides an evaluation 16 whether the calibration was good, less good or barely useful.

What is claimed is:

1. A method for operating a measuring unit having at least one sensor unit for measuring at least one parameter, said at least one sensor being at least one of a pH sensor, a temperature sensor, a conductivity sensor, a thermal conductivity sensor, or a gas sensor, at least one of at least one position sensor and an acceleration sensor, and at least a control and evaluation unit, wherein the at least one of the at least one position sensor and the acceleration sensor is connected to the control and evaluation unit, and wherein said at least one of the position sensor and the acceleration sensor emits, respectively, a position signal or an acceleration signal to the control and evaluation unit, the method comprising the steps of:
   triggering at least one process relevant to detection of at least one of pH, temperature, conductivity, thermal conductivity, or a gas, when at least one part of the measuring unit is moved according to a first movement pattern, wherein the first movement pattern comprises a sequence of at least two movements, and
   triggering at least one process step of the process when at least one part of the measuring unit is moved according to a second movement pattern, wherein the second movement pattern comprises at least one movement;
   wherein each of said first movement pattern and said second movement pattern places the measuring unit in a different operating mode.

2. The method according to claim 1, wherein the measuring unit is put into a state, by at least one movement, in which the control and evaluation unit looks for at least one of further position signals and further acceleration signals.

3. The method according to claim 1, wherein said movement of at least one part of the measuring unit is carried out by shaking, a vibration, a rotation or pivoting.

4. The method according to claim 1, wherein at least one of the first movement pattern and the second movement pattern comprises at least one of at least two identical movements and at least two different movements.

5. The method according to claim 1, wherein the process triggered by the first movement pattern is a routine for calibrating the sensor unit.

6. The method according to claim 5, wherein the process triggered by the second movement pattern is an analytical process.

7. The method according to claim 6, wherein the analytical process is a PH measuring process.

8. The method according to claim 5, wherein the calibrating step comprises comparing each of at least first measurement of a first substance and a second measurement of a second substance and comparing of values obtained during the measurements with known values of the substances measured.

9. The method according to claim 1, wherein the measuring unit has an interface for receiving a plug-in module and a plug-in module, wherein said at least one of the position sensor and the acceleration sensor is arranged in the plug-in module, wherein the plug-in module has a recognition element for marking the plug-in state, and wherein the control and evaluation unit is sensitive to at least one of position signals and acceleration signals only when the plug-in state is detected.

10. The method according to claim 9, further comprising at least one process mode being triggered by plugging the plug-in module into the interface and wherein the at least one process step is triggered when at least a part of the measuring unit is moved according to said second movement pattern.

11. The method according to claim 1, comprising the further step of emitting a feedback signal by the sensor unit when said at least one process step is at least one of triggered and terminated.

12. The method according to claim 1, comprising the further step of storing at least one of a plurality of location signals and a plurality of acceleration signals in the control and evaluation unit, wherein a first number of at least one of stored position signals and stored acceleration signals are comparison signals for movement sequences according to the first movement pattern, and wherein a second number of number of at least one of position signals and acceleration signals are comparison signals for movements according to the second movement pattern, wherein the at least one process step is assigned to each comparison signal, wherein the at least one of a position signal emitted by the position sensor and an acceleration signal emitted by the acceleration sensor is compared with the comparison signals stored in the control and evaluation unit, and wherein the at least one process step is triggered in the measuring unit based on this comparison.

13. The measuring unit according to claim 12, wherein the control and evaluation unit is adapted to detect whether the plug-in module is plugged into the interface and to evaluate at least one of a position signal and an acceleration signal when the plug-in module is detected as being plugged into the interface.

14. The measuring unit according to claim 13, wherein the recognition element comprises one of an electrical resistance, a data storage and an RFID chip.

15. A measuring unit, comprising:
at least one sensor unit for measuring at least one parameter, said at least one sensor being at least one of a pH sensor, a temperature sensor, a conductivity sensor, a thermal conductivity sensor, or a gas sensor,
at least one of a position sensor and an acceleration sensor and a control and evaluation unit,
wherein the at least one of the position sensor and the acceleration sensor is connected to the control and evaluation unit,
wherein the control and evaluation unit is adapted to trigger a process in response to at least a part of the measuring unit being moved according to a first movement pattern, and wherein the control and evaluation unit is adapted to trigger at least one measuring process step in response to at least one part of the measuring unit being moved according to a second movement pattern, said at least one measuring process step comprising detection of at least one of pH, temperature, conductivity, thermal conductivity, or a gas;
wherein each of said first movement pattern and said second movement pattern places the measuring unit in a different operating mode.

16. The measuring unit according to claim 15, wherein the measuring unit has an interface for receiving a plug-in module and a plug-in module.

17. The measuring unit according to claim 15, wherein at least one of the position sensor and the acceleration sensor is arranged in the plug-in module.

18. The measuring unit according to claim 17, wherein the plug-in module has a recognition element for marking the plug-in state.

19. The measuring unit according to claim 15, wherein the at least one sensor unit comprises a PH sensor.

20. A measuring unit, comprising:
at least one sensor unit for measuring at least one parameter,
at least one of a position sensor and an acceleration sensor and
a control and evaluation unit,
wherein the at least one of the position sensor and the acceleration sensor is connected to the control and evaluation unit,
wherein the control and evaluation unit is adapted to trigger a calibration process in response to at least a part of the measuring unit being moved according to a first movement pattern having at least two motions for calibrating the at least one sensor unit, and
wherein the control and evaluation unit is adapted to trigger at least one measuring process step in response to at least one part of the measuring unit being moved according to a second movement pattern.

* * * * *